UNITED STATES PATENT OFFICE.

GEORGE M. MOWBRAY, OF GREEN POINT, NEW YORK.

IMPROVEMENT IN PROCESSES OF DISTILLING OILS FROM COAL.

Specification forming part of Letters Patent No. 25,575, dated September 27, 1859.

*To all whom it may concern:*

Be it known that I, GEORGE MORDEY MOWBRAY, of Green Point, Kings county, Brooklyn, State of New York, have invented a new and Improved Method of Manufacturing Coal-Oil; and I do hereby declare that the following is a full and exact description thereof.

The destructive distillation of organic matters—whether for the sake of the carbonaceous residua, as in cases where bones, wood, &c., are operated upon, or for the sake of the distilled products, as where bituminous and cannel coal are treated by applying thereto heat at a certain degree of temperature—has been heretofore effected in different ways, among which distillation by means of the products of combustion generated either within the distilling-chamber or in a separate furnace, is that to which my present improvement relates. In the methods heretofore suggested, used, or patented, the distillation by this latter mode is known to have been effected by means of a draft or exhaust or strain blast applied at some point where the products of distillation issue and enter the condensing apparatus. By this mode, no matter what means be employed—whether a steam-jet or mechanical apparatus—the system necessitates a vacuum more or less perfect, in order to impel by means of the atmosphere from without the current of products of combustion to pervade the mass of coal which is being operated upon. Serious inconveniences arise from this mode of proceeding. Of these I shall only mention, first, loss of heat, owing to the expansion of products of combustion; second, introduction of atmospheric oxygen, owing to imperfect combustion and proportionate loss of hydrocarbon products; third, and lastly, the difficulty, if not impossibility, of forcing the products of combustion by this means through the fuel and mass of coal, or preventing the return of oleaginous vapors up through the incandescent fuel, the coal being actually distilled by the radiation of heat from the massive fire, and not by the products of combustion passing through the coal.

The object of my invention is to avoid these inconveniences; and it consists in distilling the coal, wood, bones, or other organic substances by products of combustion generated in a separate furnace when applied under a pressure exceeding that of the atmosphere; also, in superheating or igniting the products of combustion previous to admitting the same into the distilling-kiln, and in mixing atmospheric air with the products of combustion previous to admitting these latter into the distilling-kiln, in the manner hereinafter set forth.

To enable others skilled in the art to use my said invention, I shall now proceed to describe the manner in which the same may be carried into effect.

I use a closed distilling kiln or tower of ordinary construction, or such whereby it may be charged and discharged as the work proceeds, thus making it continuous in its operation. I prefer so to arrange the apparatus that the products of combustion can be introduced at the bottom of the kiln containing the material to be distilled, and issue, with the volatile and condensible products, at or near the top, where a conducting-channel leads to a suitable condenser, at the termination of which the incondensible products are delivered into the atmosphere. To such a kiln I adapt one or more furnaces for the generation of the heated products of combustion, to be afterward thrown into the distilling-kiln. This or these furnaces may be constructed of a circular, quadrangular, or elliptical form, with one or more charge-holes, having covers that may be rendered tight by luting, and through which the furnace may be charged and lighted. To such a furnace or furnaces I attach a blowing apparatus of any suitable construction—for instance, a fan or cylindrical pumps. I prefer the latter as the more efficient means; but in either case the blowing apparatus should be capable of forcing air into the furnace under a pressure of from six to twelve ounces per square inch. This will impel the products of combustion through the furnace, through the mass of coal in the distilling-kiln, and thence, with the oleaginous products, through the condensing apparatus, and lastly the incondensible products into the atmosphere at the point of termination of the condensing apparatus.

For the purpose of superheating the products of combustion I inclose one or more coils of pipe, open at the upper part of the furnace and terminating in the distilling-kiln, through which the blowing apparatus impels the products of combustion on their way to the distilling chamber or kiln. These coils, if of iron, must be allowed room for expansion, and should be protected by refractory fire-clay, or built into the fire-brick lining of the furnace, and are made to encircle that part of the fire where the combustion is most intense. Another means of superheating the products of combustion which I use is to provide in the center of the furnace a channel built of either fire-brick or soapstone or other refractory materials, through which the products of combustion pass, along with a sheet of atmospheric air impelled by the same blowing apparatus. This mixture at the intense temperature of the closed blast-furnace ignites, thereby increasing the temperature of the products of combustion without further expenditure of fuel. These products are now passed into the distilling-kiln by reason of the pressure produced by the blowing apparatus. An excessive admixture of atmospheric air must be avoided, otherwise the blast becoming too much cooled the mixture will not ignite, and thus in proportion as the free oxygen of the atmospheric air passes into the kiln the product is vitiated.

Having thus described my improvement, I set forth my claim as follows:

In the manufacture of coal-oil and other pyrogenous oils by exposing the coal or other materials to the products of combustion generated in a separate furnace, igniting said products of combustion, previous to admitting the same into the distilling-kiln, by admixture of a sufficient proportion of air to burn the oxide of carbon into carbonic acid, substantially as described, and for the purposes set forth.

In testimony whereof I have signed my name to this specification before two subscribing witnesses.

GEO. M. MOWBRAY.

Witnesses:
A. POLLAK,
JOHN S. HOLLINGSHEAD.